United States Patent [19]

Petitcollin et al.

[11] Patent Number: 5,135,557
[45] Date of Patent: Aug. 4, 1992

[54] PROCESS FOR BENDING AND TEMPERING GLASS SHEETS WITH LIFTING AND GRIPPING OF GLASS SHEETS IN A TEMPERING STATION

[75] Inventors: Jean-Marc Petitcollin, Thourotte; Jean Lissillour, deceased, late of Paris, both of France, by Clara Joubel, legal representative

[73] Assignee: Saint-Gobain Vitrage, Courbevoie, France

[21] Appl. No.: 483,964

[22] Filed: Feb. 15, 1990

Related U.S. Application Data

[63] Continuation of Ser. No. 296,148, Jan. 12, 1989, abandoned.

[30] Foreign Application Priority Data

Jan. 12, 1988 [FR] France .................... 88 00255

[51] Int. Cl.⁵ .................................... C03B 23/023
[52] U.S. Cl. ........................... 65/104; 65/106; 65/107; 65/114
[58] Field of Search ............... 65/104, 106, 107, 114

[56] References Cited

U.S. PATENT DOCUMENTS

| 3,529,947 | 9/1970 | Frank | 65/104 |
| 3,573,022 | 3/1971 | Frank | 65/104 |
| 4,043,785 | 8/1977 | Reese | 65/107 |
| 4,364,765 | 12/1982 | McMaster et al. | 65/106 |
| 4,519,829 | 5/1985 | Spittka et al. | 65/114 |

FOREIGN PATENT DOCUMENTS

| 0005306 | 11/1979 | European Pat. Off. |
| 0237231 | 9/1987 | European Pat. Off. |
| 2178027 | 2/1987 | United Kingdom. |

*Primary Examiner*—Joye L. Woodard
*Attorney, Agent, or Firm*—Oblon, Spivak, McClelland, Maier & Neustadt

[57] ABSTRACT

A glass sheet is transferred from a bending cell to a tempering cell on a continuous frame, after which it is held during tempering by discontinuous gripping device. Lifting studs lift the glass sheet above the frame prior to gripping.

6 Claims, 2 Drawing Sheets

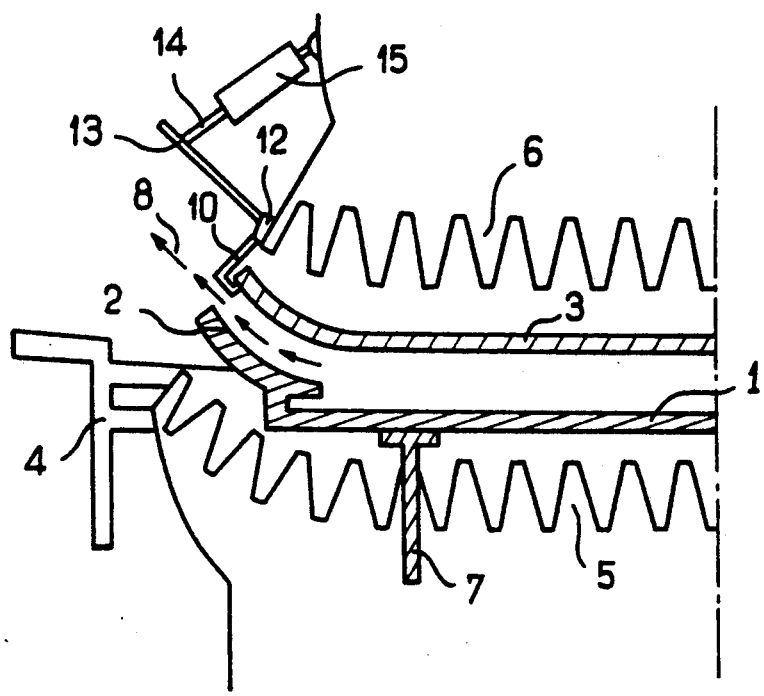
FIG_3
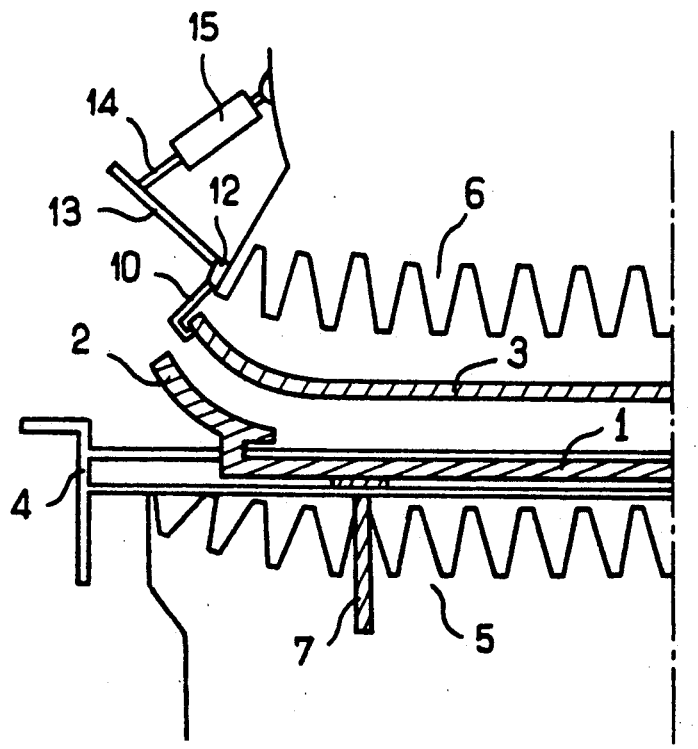
FIG_4

PROCESS FOR BENDING AND TEMPERING GLASS SHEETS WITH LIFTING AND GRIPPING OF GLASS SHEETS IN A TEMPERING STATION

This application is a continuation of application Ser. No. 07/296,148, filed on Jan. 12, 1989, now abandoned.

BACKGROUND OF THE INVENTION

1. Field of the Invention

The invention relates to techniques of bending and tempering of glass sheets, particularly to obtain formed safety glazings for motor vehicles.

2. Related Art

Glazings of motor vehicles, with the exception of windshields which most often are of the glass/plastic/glass composite type, are obtained by bending followed by a heat tempering of the glass sheets. The horizontal processes, i.e., those where the glass sheets travel approximately horizontally, are preferred because of the high rates that can be obtained. In these processes, the glass sheet goes through a tunnel furnace while conveyed on a roller bed to reach a forming station.

According to the teaching of French patents FR 2 442 219, FR 2 549 465 and FR 1 476 785, the forming station consists, for example, of a bed of curved rollers or of a guide, so that by advancing the sheet it is gradually deformed until the desired shape is obtained, after which it goes through a tempering zone in which it undergoes an intense cooling by jets of cold air.

Alternatively there are processes using a bending form and in which the glass sheet is applied against the bending form by pneumatic pressure forces (see, for example, European EP 169 770, French FR 2 085 464), then released onto a skeleton, i.e., on a peripheral ring with a curved profile defining the contours of the bent sheet; this skeleton is used as a support for the glass sheet during the later heat tempering operation.

All of these horizontal bending/tempering processes have limits if the radii of curvature of the bent glazings are small, if the bending is about multiple axes (cylindrical or spherical bending) or if the bent glazings exhibit a succession of hills and valleys (saddle type). In these cases, forming by the bed of curved rollers or by pneumatic pressure forces proves incomplete and it is necessary to provide an additional pressing step between a bending form and a counterform, for example by use of a ring (see European EP 143 691 for preforming by a roller bed or French FR 2 085 464, U.S. Pat. No. 4,661,141 for examples of forming finishing by pressing after application of a pneumatic pressure force).

According to the teachings of European EP 143 691, French FR 2 085 465 and U.S. Pat. No. 4,661,141 and others cited above, the pressing ring also supports the glass sheet during tempering. This ring therefore advantageously performs multiple roles of pressing counterform, skeleton for transporting the bent but not yet cooled sheet, and tempering skeleton. These multiple functions impose a somewhat compromised design on the skeleton; actually, to assure tempering of the entire surface of the glass, the air should be able to be evacuated easily on the edges, so the skeleton on which the glass sheet rests should be discontinuous and have numerous ventilation ducts. The drawback of such a discontinuous tempering skeleton is that it produces the risks of marking or optical deformations resulting from the pressing. Further, the more numerous the ventilation ducts (for a more homogeneous tempering of the edges) the smaller the surface on which the glass sheet actually rests and the greater the danger of sliding or even of deformation and marking of the glazing during the phases of acceleration or deceleration during its transport from the bending device to the tempering device. Marking of the glass due to the skeleton can also occur when the skeleton receives the glass sheet which is at its bending temperature (550°-650° C.), whereas the skeleton has just undergone an intense cooling by cold air sent onto the previously supported glass sheet during tempering. Use of material with a low heat transfer coefficient makes it possible to minimize this drawback but this solution considerably increases the cost of the skeletons.

Finally, the skeleton is used during the entire forming phase and especially during the entire lengthy tempering phase. To these two phases are added the times necessary to transfer the skeleton from the bending station to the tempering station, then to the station for recovery of the bent/tempered glass sheet and the return times.

It was also proposed, for example, in European patent application EP 237 231 to operate with two different skeletons: a skeleton used exclusively for pressing and a skeleton for transfer and tempering of the bent glazing. But, besides the fact that it does not solve the problems of thermal shocks and sliding of the glass, this technique requires a new design for the entire glass processing line, including especially a chamber for holding and preheating of the pressing skeleton between two treated sheets.

Further, in French patent FR 993 608, a bending/tempering process is described in which the forming is obtained by molding a glass sheet on a base whose surface has the shape corresponding to the curve to be given to the glass. When the forming is completed, the glass sheet is lifted by auxiliary supports integral with the base to introduce mobile blowing boxes on each side of the glass. This process has numerous drawbacks: first, that of requiring mobile, therefore more complex, blowing boxes, further the sheet is marked by the auxiliary supports and finally since the latter are integral with the base, the immobilization time of the latter is not reduced.

SUMMARY OF THE INVENTION

The present invention has as an object a process of bending and tempering glass sheets in horizontal position, thereby eliminating said drawbacks of the devices of the prior art. In a general process where the glass sheet is heated in horizontal position to a temperature above its deformation temperature in a furnace through which the glass sheet passes, supported by a conveyor, bent in a bending station, and transferred into a tempering station where it is intensely cooled on its two faces by blowing cold air by means of blowing boxes and evacuated to a secondary cooling station, the transfer from the bending unit to the tempering unit being performed on a frame, it is proposed according to the invention to lift the glass sheet above the frame in the tempering station and held by discontinuous gripping means, this operation beginning after a lapse of time sufficient to cause a stiffening of the glass sheet i.e., as soon as the glass sheet has cooled to below its transformation temperature.

According to another object of the invention, there is provided a frame on which the glass sheet rests during its transfer from the bending unit to the tempering unit.

The frame may be reserved exclusively for this transfer, i.e., it collects glass sheets already bent, or preferably it may also be a bending tool.

In a first embodiment of the invention, this frame can, for example, be a frame for bending by inertia and gravity, i.e., an annular form on which the glass sheet, not yet or only partially shaped, is placed and where it is deformed under the effect of its own weight, optionally with a further kinetic effect due to the fall of the glass sheet on the annular form.

According to the invention, this frame is immobilized between the tempering blowing boxes only for a limited time, sufficient for the cooling of the glass to be such that the sheet is stiffened. By way of examples for a glass sheet 4 mm thick, the tempering blowing lasts between 8 and 10 seconds and the process according to the invention makes possible the evacuation of the frame after about 3 seconds. In any case, it is possible to initiate operation of the discontinuous means at a time corresponding to half the total period of the tempering blowing, i.e., the frame is immobilized between the boxes for a period equivalent to the forming time and preferably after a period of about one third of this total period of tempering blowing. Thus, there is a gain in speed and further the frame is not as cold, which is favorable to the quality of forming and to the optical quality of the glazings.

In a second embodiment of the invention, this frame is a frame for pressing against a solid male bending form. Typically, the glass sheet is deformed by pneumatic forces—suction and/or current of ascending air—which applies it against a male form after which the frame is applied which, by pressing, succeeds in giving its shape to the glass sheet. The glass sheet is then brought to the tempering station on the frame.

Since, according to the invention, the glass sheet rests on this frame only in the first part of the tempering blowing, it is not necessary to provide the frame with air evacuation ducts. On the contrary, it is possible to use a continuous pressing ring constituting a female form, which makes it possible to assure bending without marking, including bending on noncylindrical forms. During the transfer of the bent glazing from the bending station to the tempering station, this pressing ring continues to support the entire periphery of the glass sheet, without the danger of sliding and optical deformations. Other advantages—gain in rate and less cooling of the frame—are also possible.

During the last part of the tempering, the support of the glass sheet is taken over by discontinuous gripping means, for example those integral with the tempering boxes. They make possible both the support of the glass sheet and perfect ventilation of the edges for homogeneous tempering.

The discontinuous gripping means used according to the invention preferably consist of hooks coupled by connecting rods to cylinder rods, fastened directly to the upper tempering boxes, the hooks being placed under the glass sheet after it has been lifted above the pressing ring, for example by an air cushion or by rigid lifting studs pressing through the lower tempering boxes and being translated vertically.

According to a preferred embodiment, the pressing ring is evacuated from the tempering station as soon as the glass sheet is taken over by the discontinuous gripping means and therefore is no longer present in the tempering station at the time of the tempering. It is placed in a waiting station before taking a new glazing into the bending station. This makes possible an even better ventilation of the edges since there is no danger of interference from the pressing ring. The waiting station is preferably at the same temperature as the bending station to avoid any problem of temperature difference between the glass sheet and its support.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1, 2 and 3 are schematic view of the bending station at various stages of operation of the process according to the invention; and FIG. 4 is a diagram similar to FIG. 3 but showing another embodiment of the invention.

DETAILED DESCRIPTION OF THE PREFERRED EMBODIMENTS

In a known manner, glass sheets cut to the desired dimensions are feed in horizontal position, manually or automatically, for example according to the process shown in European EP 146 442. The sheets go through a tunnel type furnace on a conveyor preferably formed by a silica roller bed and reach, when their temperature rises to 500°-700° C., a bending station in which they are, for example, first preformed. According to an embodiment of the invention, the preforming is due to a suitable deformation of the roller bed, after which the glass sheet is taken over by an upper form as in European EP 143 691. According to another embodiment of the invention, the glass sheet is immobilized under an essentially solid bending form, lifted by suction or a rising hot air current and applied by pneumatic forces against the bending form. In both cases, to complete the forming and therefore to assure that all the points of the surface of the sheet fit the contour of the upper bending form well, a continuous frame is placed under the glass sheet, which is pressed between the solid male upper form and this frame.

According to the invention, the continuous transfer frame also functions as a pressing ring and exhibits a continuous surface of contact with the glass, without the possibility of lateral evacuation. The forming is thus very exact.

Figure 1:
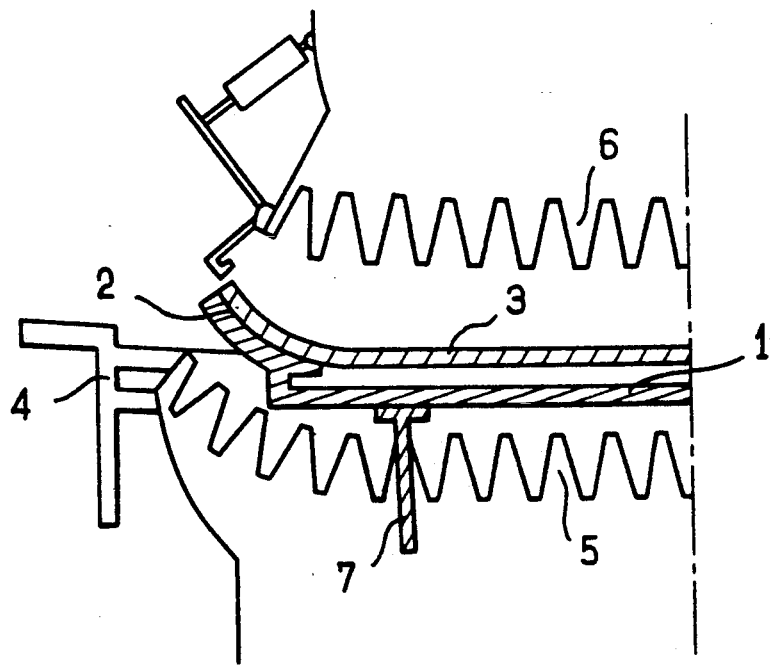
Figure 2:
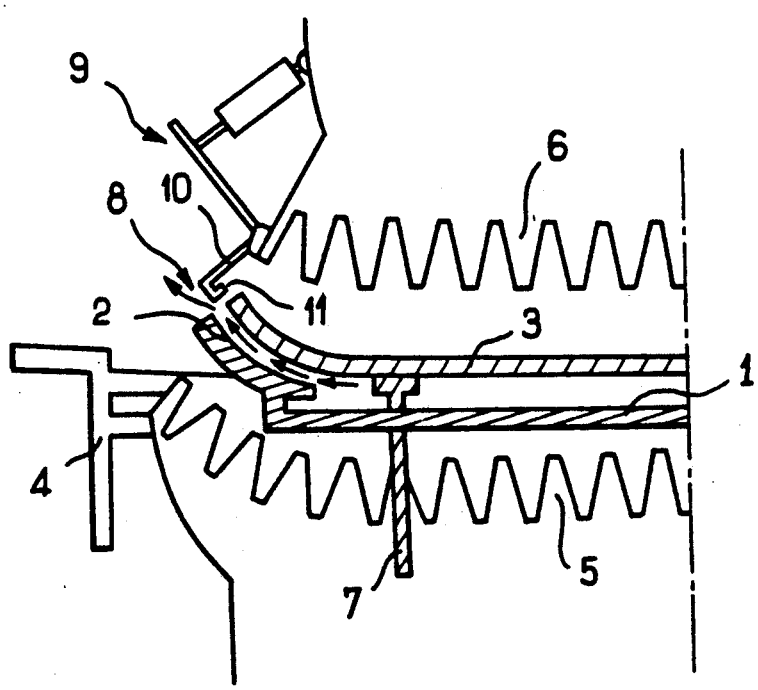

After pressing, the upper bending form is removed to allow a lateral moving of the continuous frame supporting the glass sheet; the latter is thus transferred into a tempering station shown in FIGS. 1 to 3 which are left half-views, the right part being perfectly symmetrical with the left part.

In these Figures, the continuous frame or pressing ring 1, having a continuous annular surface 2 of continuous contact with bent glass sheet 3, is integral with a movable carriage 4 which is inserted in lower blowing boxes 5 opposite upper blowing boxes 6. In a known way, the blowing boxes form a multitude of nozzles directed toward the surface of the glazing, distributed according to the contour of the glazing so that the impact force of the jets of cold air currents are identical at any point of the surface of the glass sheets.

Under pressing ring 1 are positioned spacing studs 7 which are vertically mobile by lifting devices (not shown).

Before the tempering blowing starts, or preferably just after its start so as to obtain a slight stiffening of glass sheet 3, studs 7 lift glass sheet 3 (FIG. 2). It is instead possible to initiate tempering with a blowing pressure greater for lower boxes 5 than for upper boxes 6, which creates an air cushion sufficient to make bent sheet 3 lift off pressing ring 1.

With the sheet so lifted, the air from the blowing boxes 5 can be evacuated without difficulty along the edges of the glass sheet as shown by arrows 8. However, to avoid marking of sheet 3 by studs 7 (or a different tempering of the two faces of sheet 3 if operating with different blowing levels on the two faces of sheet 3), this mode of supporting the glass sheet can be used only very temporarily and for a period preferably not exceeding 10% of the total period of the tempering blowing.

To supplement this temporary support, according to the invention gripping means 9 are provided by a plurality of hooks 10 with flat edges 11 to constitute a discontinuous frame fitting the shape of the bent glass sheet. These hooks 10 are coupled by pivots 12, fastened on the structure of upper tempering boxes 6, to connecting rods 13 connected to rod 14 of a cylinder 15. As soon as sheet 3 is lifted by studs 7 (or the differential fluid actuated air flow), cylinders 14 act on rods 13 so that hooks 10 come to be positioned under the glass sheet which is thus supported at as many points as there are hooks, without the ventilation of the edges of the glass sheet being affected.

After tempering, or shortly before the end of tempering blowing, gripping means 9 are again retracted and the sheet drops back on pressing ring 1 to be evacuated to a secondary cooling station.

FIG. 4 shows another embodiment of the invention, different from the first in that carriage 4 is not inserted in lower blowing box 5. Pressing skeleton 1 can thus be evacuated from the pressing station as soon as the glass sheet is held by gripping means and be placed in a waiting station between the bending and tempering station, and at the same temperature as the bending station, before taking on a new sheet. Evacuation of the bent-/tempered glazing from the tempering station is performed in this case, for example, by means of endless belts as is well known to one skilled in the art.

The above examples refer exclusively to a process according to which the frame is also used as a pressing frame, but as described earlier, the invention also relates to all forming processes if a frame is used for transfer of the glazing from the bending station to the tempering station.

Obviously, numerous modifications and variations of the present invention are possible in light of the above teachings. It is therefore to be understood that within the scope of the appended claims, the invention may be practiced otherwise than as specifically described herein.

What is new and desired to be secured by letters patent of the United States is:

1. A process for bending and tempering glass sheets in a horizontal position to obtain formed safety glazings for motor vehicles comprising the steps of:
   heating the glass sheet supported on a conveying means in a heating furnace to a temperature beyond the deformation temperature thereof;
   conveying the heated glass sheet to a bending station;
   bending the heated glass sheet at said bending station;
   transferring the bent glass sheet while on a continuous annular frame to a tempering station;
   blowing cold air on both faces of the glass sheet while said glass sheet is supported on the annular frame in the tempering station to cool the glass sheet;
   lifting said glass sheet above the continuous frame; and
   using discontinuous gripping means for holding the lifted glass sheet above said annular frame as soon as the glass sheet has been cooled to below the deformation temperature thereof and continuing said step of blowing cold air while said glass sheet is held by said gripping means.

2. The process according to claim 1, comprising the further step of:
   removing the annular frame from said tempering station while said glass sheet is held by said gripping means.

3. A process of claim 1 wherein said holding step is initiated when said blowing step is between one third and one half completed.

4. A process of claim 1 including a step of forming an air cushion in said tempering station for lifting the glass sheet above the continuous frame prior to said holding step.

5. A process of claim 1 including a step of using lifting studs for lifting the glass sheet above the continuous frame prior to said holding step.

6. A process of claim 1 including the step of supporting the glass sheet on said frame in said bending station and using said frame as a pressing form.

* * * * *